United States Patent [19]

Buyalos et al.

[11] Patent Number: 5,033,523

[45] Date of Patent: Jul. 23, 1991

[54] HIGH STRENGTH POLYESTER YARN FOR IMPROVED FATIGUE RESISTANCE

[75] Inventors: Edward J. Buyalos, Chester; David W. Millure, Richmond, both of Va.; James G. Neal, Raleigh; Hugh H. Rowan, Chapel Hill, both of N.C.

[73] Assignee: Allied-Signal Inc., Morris Township, Morris County, N.J.

[21] Appl. No.: 588,869

[22] Filed: Sep. 27, 1990

Related U.S. Application Data

[62] Division of Ser. No. 280,764, Dec. 7, 1988, Pat. No. 4,975,326, which is a division of Ser. No. 57,603, Jun. 3, 1987, abandoned.

[51] Int. Cl.$^5$ .............................................. B60C 9/00
[52] U.S. Cl. ................................... 152/451; 152/527; 152/556; 428/364; 428/373; 428/395; 428/293; 428/295; 57/902
[58] Field of Search .................... 152/451, 527, 556; 428/364, 395, 373, 293, 294, 295, 411; 57/243, 902

[56] References Cited

U.S. PATENT DOCUMENTS

| | | | |
|---|---|---|---|
| 4,100,142 | 7/1978 | Schaefer et al. | 526/68 |
| 4,101,525 | 7/1978 | Davis et al. | 264/290.5 X |
| 4,113,821 | 9/1978 | Russell et al. | 264/290.5 X |
| 4,195,052 | 3/1980 | Davis et al. | 264/210.8 X |
| 4,491,657 | 1/1985 | Saito et al. | |
| 4,529,655 | 7/1985 | Palmer | 428/364 X |
| 4,675,378 | 6/1987 | Gibbon et al. | 528/272 |
| 4,690,866 | 9/1987 | Kumakawa et al. | 428/364 |
| 4,827,999 | 5/1989 | Yabuki et al. | 264/210.8 X |

FOREIGN PATENT DOCUMENTS

| | | |
|---|---|---|
| 80906 | 6/1983 | European Pat. Off. |
| 56-116719 | 9/1981 | Japan. |
| 2058805 | 4/1981 | United Kingdom. |

*Primary Examiner*—Lorraine T. Kendell
*Attorney, Agent, or Firm*—William H. Thrower

[57] ABSTRACT

High strength polyester multifilament yarn of improved dimensional stability, which has the proper combination of an intrinsic viscosity of at least 0.90, relatively low work loss and a high degree of toughness, is incorporated as tire cord into a rubber tire for reinforcement to provide an important improvement in fatigue life and retained fatigue strength. The continuous melt-spin process comprises the steps of feeding prepolymer to a first finisher vessel to achieve at least 0.4 intrinsic viscosity transferring polymer to a second finisher vessel for a period sufficient to achieve an intrinsic viscosity of at least 0.95, and supplying this polymer to an extrusion spinnerette.

3 Claims, No Drawings

5,033,523

HIGH STRENGTH POLYESTER YARN FOR IMPROVED FATIGUE RESISTANCE

This application is a division of application Ser. No. 280,764, filed Dec. 7, 1988 now U.S. Pat. No. 4,975,326 which is a divisional of application Ser. No. 057,603 filed June 3, 1987 and now abandoned.

BACKGROUND OF THE INVENTION

1. Field of the Invention

This invention relates to a high performance multifilament yarn useful in industrial applications including the reinforcement of tires and the process for its production.

2. Description of the Prior Art

Polyethylene terephthalate filaments of high strength are well known in the art and are commonly utilized in industrial applications including tire cord for rubber reinforcement, conveyor belts, seat belts, V-belts and hosing.

Work has been done to establish that filamentary material which undergoes a relatively low degree of shrinkage for a high strength fibrous material and which exhibits a low degree of hysteresis or work loss is particularly suited for use in environments where elevated temperatures (e.g. 80° to 180° C.) are encountered and wherein the fibrous material is repeatedly fatigued. U.S. Pat. No. 4,101,525 to Davis et al. provides a high strength multifilament polyester yarn with low shrinkage and work loss characteristics. U.S. Pat. No. 4,491,657 to Saito et al. discloses high modulus, low shrinkage polyester yarn, but requires a low terminal modulus to achieve good yarn to treated cord conversion efficiency for such dimensionally stable yarns.

Continued improvement in high strength industrial yarns particularly suited for use as fibrous reinforcement in rubber tires is an ongoing need in the industry.

SUMMARY OF THE INVENTION

The invention is directed to high strength polyester multifilament yarn of improved dimensional stability and the process for its production. It has been found that such yarn which has the proper combination of low work loss and a high degree of toughness, when incorporated as tire cord into a rubber tire for reinforcement, provides an important improvement in fatigue life and retained fatigue strength. The polyester yarn of the invention is characterized as follows:

(a) an intrinsic viscosity (IV) of at least 0.90,
(b) a load at 5 percent elongation (LASE-5) of at least 3.7 grams per denier at 25° C.,
(c) a tenacity of at least 7.5 grams per denier at 25° C.
(d) a shrinkage of less than 8 percent in air at 177° C.,
(e) a work loss of less than 0.04 inch-pounds when cycled between a stress of 0.6 gram per denier and 0.05 gram per denier at 150° C. measured at a constant strain rate of 0.5 inch per minute in a 10-inch length of yarn normalized to that of a multifilament yarn of 1000 total denier,
(f) a toughness of at least 0.40 grams per denier, said yarn providing enhanced fatigue resistance when incorporated as tire cord into rubber tires.

The process of the invention provides for a continuous melt-spun process for production of high performance polyester multifilament yarn with an intrinsic viscosity of at least 0.90 whereby polymer melt of intrinsic viscosity of at least 0.95 is removed from a finisher and delivered to an extrusion spinnerette for spinning into said high performance yarn. This process comprises the steps of feeding prepolymer to a first finisher vessel operated at 280° C. or less for a period sufficient to achieve at least 0.4 intrinsic viscosity, transferring polymer to a second finisher vessel while maintaining the polymer below about 280° C., said second finishing vessel having good film forming ability, maintaining said polymer in said second finisher at 280° C. for a period sufficient to achieve an intrinsic viscosity of at least 0.95, and supplying this polymer to an extrusion spinnerette.

DESCRIPTION OF THE PREFERRED EMBODIMENT

The high strength polyester multifilament yarn of the present invention combines dimensional stability and relatively low work loss with high intrinsic viscosity and high toughness. The resulting yarn, when incorporated as fibrous reinforcement into rubber composites such as tires, provides improved fatigue resistance and fatigue life.

The polyester yarn contains at least 90 mol percent polyethylene terephthalate (PET). In a preferred embodiment, the polyester is substantially all polyethylene terephthalate. Alternatively, the polyester may incorporate as copolymer with minor amounts of units derived from one or more ester-forming ingredients other than ethylene glycol and terephthalic acid or its derivatives. Illustrative examples of other ester-forming ingredients which may be copolymerized with the polyethylene terephthalate units include glycols such as diethylene glycol, trimethylene glycol, tetramethylene glycol, hexamethylene glycol, etc., and dicarboxylic acids such as isophthalic acid, hexahydroterephthalic acid, bibenzoic acid, adipic acid, sebacic acid, azelaic acid, etc.

The multifilament yarn of the present invention commonly possesses a denier per filament of about 1 to 20 (e.g. about 3 to 15), and commonly consists of about 6 to 600 continuous filaments (e.g. about 20 to 400 continuous filaments). The denier per filament and the number of continuous filaments present in the yarn may be varied widely as will be apparent to those skilled in the art.

The multifilament yarn particularly is suited for use in industrial applications wherein high strength polyester fibers have been utilized in the prior art. The fibers are particularly suited for use in environments where elevated temperatures (e.g. 80° C. to 180° C.) are encountered. Not only does the filamentary material undergo a relatively low degree of shrinkage for a high strength fibrous material, due to less oriented amorphous regions, and exhibit a low degree of hysteresis or work loss during use in environments wherein it is repeatedly stretched and relaxed, but it provides enhanced resistance to fatigue due to these effects, higher yarn toughness, and smaller morphological repeat units.

Resistance to fatigue is not a property which can be related to any single parameter but depends on a combination of variables such as IV, work loss, toughness, and undoubtedly fine morphological characteristics such as crystallite and amorphous sizes and orientation and amorphous region mobility. It is believed that the yarn of the present invention has reached a high level of synergism between these and other intangible characteristics, in addition to possessing high toughness in combination with low work loss, which yields improved fatigue resistance.

The characterization parameters referred to herein may conveniently be determined by testing the multifilament yarn which consists of substantially parallel filaments.

Lateral and longitudinal crystallite sizes were calculated with the Scherrer equation employing the width at half-height of the (010) and ($\bar{1}$05) reflections of the wide angle x-ray diffraction pattern:

$$L = \frac{k\lambda}{\beta \cos(2\phi/2)}$$

where:
L = crystal size (angstrom);
k = shape factor = 1.0;
$\lambda$ = wavelength of x-rays = 1.54 angstrom;
$\beta$ = width at half-height of reflection (rad);
$2\phi$ = Bragg angle (degrees).

Crystal orientations were determined with Herman's orientation function employing the average angular azimuthal breadth of the (010) and (100) reflections of the wide angle x-ray diffraction pattern:

$$f_c = \tfrac{1}{2}(3 \cos^2\phi - 1)$$

where,
$f_c$ = crystal orientation function
$\phi$ = average orientation angle

Long periods were calculated from small angle x-ray diffraction patterns and amorphous thickness is determined by subtraction of the longitudinal crystallite size from the long period.

Birefringence was determined using a polarizing light microscope equipped with a Berek compensator and the fraction crystallinity was determined by conventional density measurements. The amorphous orientation function was determined from the following relationship (see R. J. Samuels, Structured Polymer Properties, New York, John Wiley & Sons).

$$\Delta n = X f_c \Delta n_c + (1-X) f_a \Delta n_a + \Delta n_f$$

where
$\Delta n$ = birefringence
X = fraction crystalline
$f_c$ = crystalline orientation function
$\Delta n_c$ = intrinsic birefringence of crystal (0.220 for polyethylene terephthalate)
$f_a$ = amorphous orientation function
$\Delta n_a$ = intrinsic birefringence of amorphous (0.275 for polyethylene terephthalate)
$\Delta n_f$ = form birefringence (negligable for this system)

Intrinsic viscosity (IV) was determined in a mixed solvent consisting of phenol and tetrachloroethane (60/40 weight percent).

Carboxyl end-group concentration is determined as follows. First, 2 grams PET is dissolved in 50 ml of o-cresol/chloroform solution (70/30 by weight) to which 10 drops of saturated lithium chloride solution in isopropanol is added. This solution is potentiometrically titrated with 0.25N KOH in isopropanol.

The tenacity values (i.e. at least 7.5 grams per denier), and load at 5 percent elongation values (i.e. at least 3.7 grams per denier of the present yarn compare favorably with these particular parameters exhibited by commercially available polyethylene terephthalate tire cord yarns. The tensile properties referred to herein may be determined through the utilization of an Instron tensile tester (Model TM) using a 10-inch gauge length and a strain rate of 120 percent per minute in accordance with ASTM D885.

The high strength multifilament yarn of the present invention possesses an internal morphology which, for a LASE-5 of 3.5 grams per denier or greater, manifests an unusually low shrinkage propensity of less than 7 percent, and preferably less than 6 percent when measured in air at 177° C. For instance, filaments of commercially available polyethylene terephthalate tire cord yarns commonly shrink about 12 to 15 percent when tested in air at 177° C. These shrinkage values may be determined under a load of 0.05 gram per denier in accordance with ASTM D885-30.3. Such improved dimensional stability is of particular importance if the product serves as fibrous reinforcement in a radial tire.

Considerable work has been done to relate hysteresis or work loss to tire performance, particularly heat generation. The work of Prevorsek et al. has been particularly noteworthy:

1. D. C. Prevorsek, Y. D. Kwon and R. K. Sharma, "Interpretive Nonlinear Vioscoelasticity: Dynamic Properties of Nylon 6 Fibers", J. Macromol. Sci. Phys. B-13 (4), 571-1977;

2. Y. D. Kwon, R. K. Sharma and D. C. Prevorsek, "Viscoelastic Properties of Tire Cords Under Conditions of Rolling Tires", Proceedings of ASTM Symposium on Tire Reinforcement and Tire Performance, (ASTM Special Technical Publication 694), p. 239, 1979.

The cords are the load bearing element in tires and as their temperature increases several undesirable consequences follow. It is well known that rates of chemical degradation increase with increasing temperature. And, it is also well known that fiber moduli decrease as the cord temperatures increase which permits greater strains in the tire to increase the heat generated in the rubber. All of these factors will tend to increase the temperature of cords still further and if the increases are great enough, tire failure can result.

The work loss method described in U.S. Pat. No. 4,101,525 to Davis et al., incorporated herein by reference, provides a relatively simple procedure for estimating this factor and we utilize it for convenience.

The yarn of the present invention further provides low work loss or low hysteresis characteristics (i.e. low heat generating characteristics) in addition to its relatively low shrinkage propensity for a high strength fibrous material. The yarn of the present invention exhibits a work loss of less than 0.04 inch-pounds when cycled between a stress of 0.6 gram per denier and 0.05 gram per denier at 150° C. measured at a constant strain rate of 0.5 inch per minute on a 10-inch length of yarn normalized to that of a multifilament yarn of 1000 total denier as described hereafter. In the present invention it is shown that for significantly improved performance properties it is not necessary to have a yarn work-loss below 0.02 as taught in the Davis patent. For example, work loss is a mechanism by which materials dissipate energy upon deformation. If no or little work loss exists, this energy may not all be dissipated and can cause scission of the polymer chains of the yarn resulting in degradation of properties. It is desirable, however, to maintain a relatively low level of work loss (<0.04) or heat generation.

Additionally, it has been found that the yarn of the present process exhibits greatly improved fatigue resistance when compared to high strength polyethylene terephthalate fibers conventionally utilized to form tire cords. Such fatigue resistance enables the fibrous reinforcement when embedded in rubber to better withstand bending, twisting, shearing, and compression. The superior fatigue resistance of the product of the present invention can be demonstrated through the use of the modified (9-inch tube) Goodyear Mallory Fatigue Test (ASTM-D-885-64T), or the Goodrich Disk Fatigue Test (ASTM-D-885-64T).

It has been found that the present invention particularly provides substantial improvement in the long term disk fatigue measured by the Goodrich Test while providing desired dimensional stability and low work loss.

The importance of toughness as a characteristic mechanical property in combination with the relatively low work loss and high intrinsic viscosity is thought to be established by applicant's invention. "Toughness" or the "work of rupture" is the energy or work required to break a specimen. It is measured as the integrated area under a stress/strain curve and is given in units of grams per denier. Applications which require good impact resistance frequently require materials of high toughness.

With the yarn of this invention, it is possible to construct tire cord from the yarn with lower twist. One skilled in the art recognizes that in construction of tire cord a higher level of twist serves to increase fatigue resistance, but at the expense of strength and LASE-5, which is reduced. Higher LASE-5 is desirable to reduce side wall indentations. Therefore, with the improved fatigue resistance offered by the yarn of this invention, it becomes possible to lower the level of twisting in the construction of the tire cord, thus maintaining greater strength and LASE-5.

Identified hereafter is a description of a process which has been found to be capable of forming the improved yarn of the present invention. The yarn product claimed hereafter is not to be limited by the parameters of the process which follows.

EXAMPLE 1

Polyester yarn of high intrinsic viscosity (e.g. at least 0.90) is produced in the following manner. Prepolymer having 25-30 carboxyl end groups (in milliequivalents/$10^6$ grams) and an intrinsic viscosity of 0.20-0.23 is fed to the first of two finisher type vessels. Suitable apparatus for the prefinisher is disclosed in U.S. Pat. No. 3,617,225 to Kuehue, incorporated herein by reference. Because a prefinisher and a finisher is used in this process, the temperatures of the polymer can be reduced. Reduced polymer temperature allows higher intrinsic viscosity polymer to be delivered to spinning. The prepolymer contains 300-400 ppm antimony catalyst along with 0.5 to 1.5 ppm titanium catalyst. The prefinisher is operated at 270°-280° C., and about 2 Torr vacuum. Retention time in the prefinisher is maintained at 1.5-2.3 hours. With careful selection of catalyst type and level, the carboxyl level of the polymer exiting the vessel is 10-14 units with the intrinsic viscosity being at least 0.4, preferably 0.50-0.55. The prefinisher has multiple stages and film forming devices to allow increased viscosities in the above-stated time. Polymer is removed from the prefinisher and transferred using equipment selected to minimize shear, temperature increases, dead spots, and other potential degradation problems. The polymer is pumped through a polymer cooler to lower the temperature to about 275° C. before entering the finisher. The polymer then enters a second vessel selected for good film forming ability and narrow distribution of residence time. A preferred reactor would contain the specially designed wiped wall reactor in U.S. Pat. No. 3,976,431 to Boggs et al., and the specially designed spoked wheel projections in U.S. Pat. No. 3,728,083, both patents incorporated herein by reference. Suggested operating conditions are 273°-280° C. for a 1.5-2.0 hour retention time. The reactor is operated at 0.3-0.5 Torr with the exit viscosity being at least 0.95. Polymer is removed from the finisher through a wide mouth low shear gear pump designed to raise the polymer temperature as little as possible (e.g. only 3°-4° C.). The pump is sized such that the speed of the pump and the change in temperature is a minimum. A phosphorus compound can be added before the finisher to help reduce thermal degradation of the polymer through the reactor and transfer lines. There are no baffles in the final finisher and only the rotating wheels acts as stages to prevent bypassing in this reactor. This allows minimum holdup in the finisher. Polymer is pumped to spinning, with transfer lines sized to reduce thermal degradation. For minimum thermal degradation of the polymer, pipes are sized for flow of polymer melt in accordance with the teachings of U.S. Pat. No. 4,072,663 to Pendlebury, incorporated herein by reference. Static mixers are used throughout the transfer lines to mix and help keep polymer temperatures reduced with colder dowtherm maintained at about 275° C. The improved melt-spinning process of this invention at the above operating conditions produces yarn with IV's of at least 0.90 with 15-16 carboxyl units. Those skilled in the art will appreciate that only yarn less than 0.90 IV can be produced with a conventional one finisher high temperature reactor system such as outlined in U.S. Pat. No. 4,100,142. Those skilled in the art will appreciate, that prior to this invention only solid state polymerization or use of additives could produce intrinsic viscosities in the range given herein.

The melt-spinable polyester is supplied to an extrusion spinnerette at a temperature above its melting point and below the temperature at which the polymer degrades substantially. The residence time at this stage is kept to a minimum (e.g. up to one and one-half minutes) and the temperature should not rise above 315° C., preferably 310° C. The extruded filaments then traverse a conventional yarn solidification zone where quench air impinges on the spun yarn thereby freezing in desirable internal structural features and preventing the filaments from fusing to one another. The key to the current process is to utilize extruding polymer with IV greater than 0.90 and adjust processing conditions to achieve an undrawn yarn birefringence of at least 0.01, preferably 0.022-0.030. One skilled in the art can achieve this undrawn birefringence by adjusting the following conditions: length and temperature of an annealing zone adjacent to the spinnerette, diameter of the spinnerette holes, method of blowing the quench, quench air velocity, and drawdown in the quench column.

The spun yarn was then drawn between rolls at temperatures above the glass transition temperature (80° C.) to within 85 percent of the maximum draw ratio. This drawing process involved multiple drawing and conditioning steps to achieve a tenacity above 7.5 grams per denier, a LASE-5 above 3.7 grams per denier and a shrinkage less than 8 percent. The drawn yarn was then taken up on a bobbin after adjustment of the tension to achieve a satisfactory package.

It will be appreciated by those of skill in the art that the high viscosity polymer spun as above can be drawn in known ways such as that disclosed in U.S. Pat. No. 4,195,052 to Davis et al. and in U.S. Pat. No. 4,251,481 to Hamlyn.

EXAMPLE 2

Polyester yarns (1000 denier) of IV=0.87 (yarn A) and IV=0.92 (yarn B) were produced as in Example 1. The properties of yarn A and yarn B are compared to a conventional high tenacity PET tire yarn C (1000 denier) (Allied 1W70) in Table I. It is clear from Table I that yarn B of the present invention possesses a relatively high LASE-5 when compared to conventional yarn C yet undergoes less shrinkage at elevated temperatures. Tire cords were prepared from yarns A, B and C in a 9×9 construction (turns per inch×turns per inch) and given a typical tensilizing treatment before fatigue testing. The fatigue data in Table I shows the cord prepared from yarn B of the present invention to possess improved fatigue properties when compared to a conventional cord from yarn C to cord prepared from yarn A with lower IV. Characteristic morphological properties of the yarns B and C are summarized in Table II.

EXAMPLE 3

It is the intent of this example to demonstrate that the increased fatigue life of cords prepared from yarns of the present invention can be utilized to produce cords of high LASE-5 by decreasing twist levels without sacrificing fatigue life relative to a conventional tire cord. Cords were constructed at twist levels listed in Table III from yarns prepared as in Example 1 and from a conventional, commercially available tire yarn (Allied 1W70). It is well known in the art that for a given yarn, decreasing the twist level results in increased LASE-5 and decreased fatigue strength. Table III shows that by decreasing the twist level of the cords of the present invention the LASE can be increased greater than 20 percent (10×10 compared to 8×8) without sacrificing fatigue strength relative to the conventional cord.

EXAMPLE 4

The purpose of this example is to distinguish the yarn of the present invention from those discussed previously. Yarn D (Celanese T100) represents a prior art yarn in which the desirable fatigue properties are derived mainly from low work loss. A comparison of the properties of this prior art yarn D and the yarn of this disclosure and cords prepared from both yarns show the advantages given in fatigue properties of the present yarn because of the unique combination of relatively low work loss and high toughness. (Table IV)

TABLE I

| Property | A | B | C |
|---|---|---|---|
| Yarn: | | | |
| Tenacity, g/d | 7.9 | 8.5 | 8.6 |
| Elongation at break, % | 10.2 | 9.9 | 12.6 |
| Terminal Modulus, g/d | 72 | 62 | 39 |
| LASE-5, g/d | — | 4.1 | 3.8 |
| Shrinkage at 177° C., % | 6.0 | 5.7 | 8.5 |
| Toughness, g/d | — | 0.44 | 0.67 |
| Work Loss, in.-lb | 0.024 | 0.025 | 0.06 |
| Cord: fatigue properties | | | |

TABLE I-continued

| Property | A | B | C |
|---|---|---|---|
| Mallory, kilocycles | 190 | 238 | 67 |
| Disk Fatigue, retained strength, % | 92 | 100 | 88 |

TABLE II

| Parameter | B | C |
|---|---|---|
| Long Period, angstroms | 118 | 144 |
| Lateral Crystal Size, angstroms | 26 | 28 |
| Longitudinal Crystal Size, angstroms | 43 | 45 |
| Amorphous Thickness, angstroms | 75 | 99 |
| Birefringence | 0.2138 | 0.2330 |
| Crystallinity, % | 40.5 | 49.9 |
| Crystal Orientation Function | 0.95 | 0.92 |
| Amorphous Orientation Function | 0.79 | 0.96 |

TABLE III

| Construction | Retained Fatigue Strength, % | | LASE-5, g/d | |
|---|---|---|---|---|
| | Present | Conventional | Present | Conventional |
| 7 × 7 | 67 | — | 6.9 | — |
| 8 × 8 | 88 | — | 6.7 | — |
| 9 × 9 | 96 | — | 5.9 | — |
| 10 × 10 | 98 | 80 | 5.3 | 5.5 |

TABLE IV

| Property | B | D |
|---|---|---|
| YARN PROPERTIES | | |
| Tenacity, g/d | 8.5 | 8.0 |
| Elongation at Break, % | 9.9 | 8.8 |
| LASE-5, g/d | 4.1 | 4.8 |
| Toughness, g/d | 0.44 | 0.36 |
| Work Loss, in.-lb | 0.025 | 0.019 |
| CORD PROPERTIES (9 × 9 Construction) | | |
| Mallory, kilocycles | 238 | 137 |
| Disk Fatigue, retained strength, % | 100 | 80 |
| LASE-5, g/d | 2.4 | 2.4 |
| Shrinkage, % | 1.7 | 1.4 |

What is claimed:

1. A rubber composite comprising polyester multifilament yarn as fibrous reinforcement, said yarn made by a continuous polymerization and melt-spun process and comprising at least 90 mol percent polyethylene terephthalate and having the following combination of characteristics:
   (a) an intrinsic viscosity of at least 0.90,
   (b) a load at 5 percent elongation of at least 3.7 g/d at 25° C.,
   (c) a tenacity of at least 7.5 grams per denier at 25° C.,
   (d) a shrinkage of less than 8 percent in air at 177° C.,
   (e) a work loss of less than 0.04 inch-pounds when cycled between a stress of 0.6 gram per denier and 0.05 gram per denier at 160° C. measured at a constant strain rate of 0.5 inch per minute in a 10-inch length of yarn normalized to that of a multifilament yarn of 1000 total denier,
   (f) a toughness of at least 0.40 grams per denier, said yarn providing enhanced fatigue resistance when incorporated as fibrous reinforcement into rubber tires.
2. The rubber composite of claim 7 which is a tire.
3. The rubber composite of claim 8 wherein said polyester multifilament yarn is incorporated in said tire as tire cord.

* * * * *

UNITED STATES PATENT AND TRADEMARK OFFICE
CERTIFICATE OF CORRECTION

PATENT NO.  : 5,033,523

DATED       : July 23, 1991

INVENTOR(S) : Edward J. Buyalos, David W. Millure, James G. Neal, Hugh H. Rowan

It is certified that error appears in the above-identified patent and that said Letters Patent is hereby corrected as shown below:

Col. 8, line 64, "7" should read --1--

Col. 8, line 65, "8" should read --2--

Signed and Sealed this

Third Day of November, 1992

Attest:

DOUGLAS B. COMER

Attesting Officer

Acting Commissioner of Patents and Trademarks